US009953266B2

(12) United States Patent
Brady et al.

(10) Patent No.: US 9,953,266 B2
(45) Date of Patent: Apr. 24, 2018

(54) MANAGEMENT OF BUILDING ENERGY SYSTEMS THROUGH QUANTIFICATION OF RELIABILITY

(71) Applicant: International Business Machines Corporation, Armonk, NY (US)

(72) Inventors: Niall Brady, Kildare (IE); Bernard Gorman, Dublin (IE); Raymond Lloyd, Navan (IE); Joern Ploennigs, Dublin (IE); Anika Schumann, Dublin (IE); Olivier Verscheure, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 14/541,638

(22) Filed: Nov. 14, 2014

(65) Prior Publication Data

US 2016/0140443 A1 May 19, 2016

(51) Int. Cl.
*G06N 5/04* (2006.01)
*G06F 17/30* (2006.01)

(52) U.S. Cl.
CPC ......... *G06N 5/046* (2013.01); *G06F 17/3056* (2013.01); *G06F 17/30368* (2013.01)

(58) Field of Classification Search
CPC .......... G06N 5/046; G06N 5/025; G06N 5/04; G06N 7/005; G06F 17/30368; G06F 17/3056; G06F 15/18
USPC ...................................................... 706/46–47
See application file for complete search history.

(56) References Cited

U.S. PATENT DOCUMENTS

| | | | |
|---|---|---|---|
| 2011/0193720 A1 | 8/2011 | Chambers et al. | |
| 2011/0257911 A1* | 10/2011 | Drees | G05B 15/02 702/61 |
| 2011/0276165 A1* | 11/2011 | Ko | G06N 5/04 700/104 |
| 2012/0259583 A1* | 10/2012 | Noboa | G05B 15/02 702/179 |
| 2014/0058539 A1* | 2/2014 | Park | G05B 15/02 700/50 |
| 2014/0088945 A1* | 3/2014 | Davis | G06F 17/5004 703/13 |

OTHER PUBLICATIONS

Lu Z. et al., "Welch's t test", Jan. 2010.*
(Continued)

*Primary Examiner* — Dave Misir
(74) *Attorney, Agent, or Firm* — Stosch Sabo

(57) ABSTRACT

Energy usage can be monitored within at least one building having a plurality of energy consuming components. A database can be generated that contains values for a set of data points corresponding to data received from the plurality of energy consuming components. A change in a configuration can be detected for the plurality of energy consuming components based upon a change in values received from plurality of energy consuming components relative to the database. Based upon the change, an additional data point can be added to the set of data points in the database. Based upon the values for the set of data points, a probability can be determined that a rule for the additional data point is valid. A message can then be generated that includes the determined probability.

19 Claims, 5 Drawing Sheets

(56) References Cited

OTHER PUBLICATIONS

Brady et al., "Configuring Building Energy Management Systems Using Knowledge Encoded in Building Management System Points Lists," U.S. Appl. No. 13/711,012, filed Dec. 11, 2012.
Brady et al., "Configuring Building Energy Management Systems Using Knowledge Encoded in Building Management System Points Lists," U.S. Appl. No. 14/032,847, filed Sep. 20, 2013.
Missaoui et al., "Real Time Validation of an Optimization Building Energy Management Strategy Based on Power-Hardware-in-the-loop Tool," 3rd IEEE PES International Conference and Exhibition on Innovative Smart Grid Technologies, Oct. 14-17, 2012 doi: 10.1109/ISGTEurope.2012.6465791.
Unknown, "Building Management Systems Validation and Verification," Health Technical Memorandum 2005, NHS Estates an Executive Agency of the Department of Health, © Crown copyright 1996 ISBN 0-11-322241-6.

* cited by examiner

US 9,953,266 B2

MANAGEMENT OF BUILDING ENERGY SYSTEMS THROUGH QUANTIFICATION OF RELIABILITY

BACKGROUND

The present disclosure relates to managing energy systems for buildings (or just "building energy systems"), and more specifically, to managing building energy systems using a quantification of the reliability of system input.

Building energy systems can be managed using a centralized system that monitors the various components, provides control functions, and offers reporting of operational faults and other issues. The detection of energy waste that can result from operational faults (for example if a room is heated and cooled simultaneously) or from faults of heating, ventilation, or air conditioning (HVAC) equipment can translate into significant energy savings especially if these faults are detected right away. For example, an estimated 15% to 30% of energy could be saved if faults in the HVAC system and its operation could be detected in a timely manner.

SUMMARY

According to various embodiments, energy usage can be monitored within at least one building having a plurality of energy consuming components. A database can be generated that contains values for a set of data points corresponding to data received from the plurality of energy consuming components. A change in a configuration can be detected for the plurality of energy consuming components based upon a change in values received from plurality of energy consuming components relative to the database. In some embodiments, a change in configuration can be detected based upon other values stored in the database. Based upon the change, an additional data point can be added to the set of data points in the database. Based upon the values for the set of data points, a probability can be determined that a rule for the additional data point is valid. In response to the probability, a message can be generated that includes the determined probability.

Consistent with certain embodiments a computer system can be provided for monitoring energy usage within at least one building having a plurality of energy consuming components. The system can include at least one processor circuit that is configured to include: a knowledge base generator configured to generate a database containing values for a set of data points corresponding to data received from the plurality of energy consuming components; a change detector engine configured to: detect a change in a configuration for the plurality of energy consuming components based upon a change in values received from plurality of energy consuming components relative to the database. In some embodiments, a change in configuration can be detected based upon other values stored in the database. The detector engine can also be configured to add, based upon the change, an additional data point to the set of data point in the database. A configuration modification engine can be configured to modify configuration settings to include a rule for the additional data point. A reliability engine can be configured to determine, based upon the values for the set of data points, a probability that the rule for the additional data point is valid. In some embodiments, the reliability engine can determine whether an existing data point is valid. An interface module can be configured to generate, in response to the probability, a message that includes the determined probability.

Certain embodiments are directed towards a computer program product for monitoring energy usage within at least one building having a plurality of energy consuming components. The computer program product can include a computer readable storage medium having program instructions embodied therewith. The computer readable storage medium is not a transitory signal per se, and the program instructions are executable by at least one computer processor circuit to cause the at least one computer processor circuit to perform a method. The method includes: generating, by the at least one computer processor circuit, a database containing values for a set of data points corresponding to data received from the plurality of energy consuming components; detecting, by the at least one computer processor circuit, a change in a configuration for the plurality of energy consuming components based upon a change in values received from plurality of energy consuming components relative to the database. In some embodiments, a change in configuration can be detected based upon other values stored in the database. The method can also include: adding, by the at least one computer processor circuit and based upon the change, an additional data point to the set of data point in the database; determining, by the at least one computer processor circuit and based upon the values for the set of data points, a probability that a rule for the additional data point is valid or, in some embodiments, a probability that an existing data point is valid. The method can further include generating, by the at least one computer processor circuit and in response to the probability, an message that includes the determined probability.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
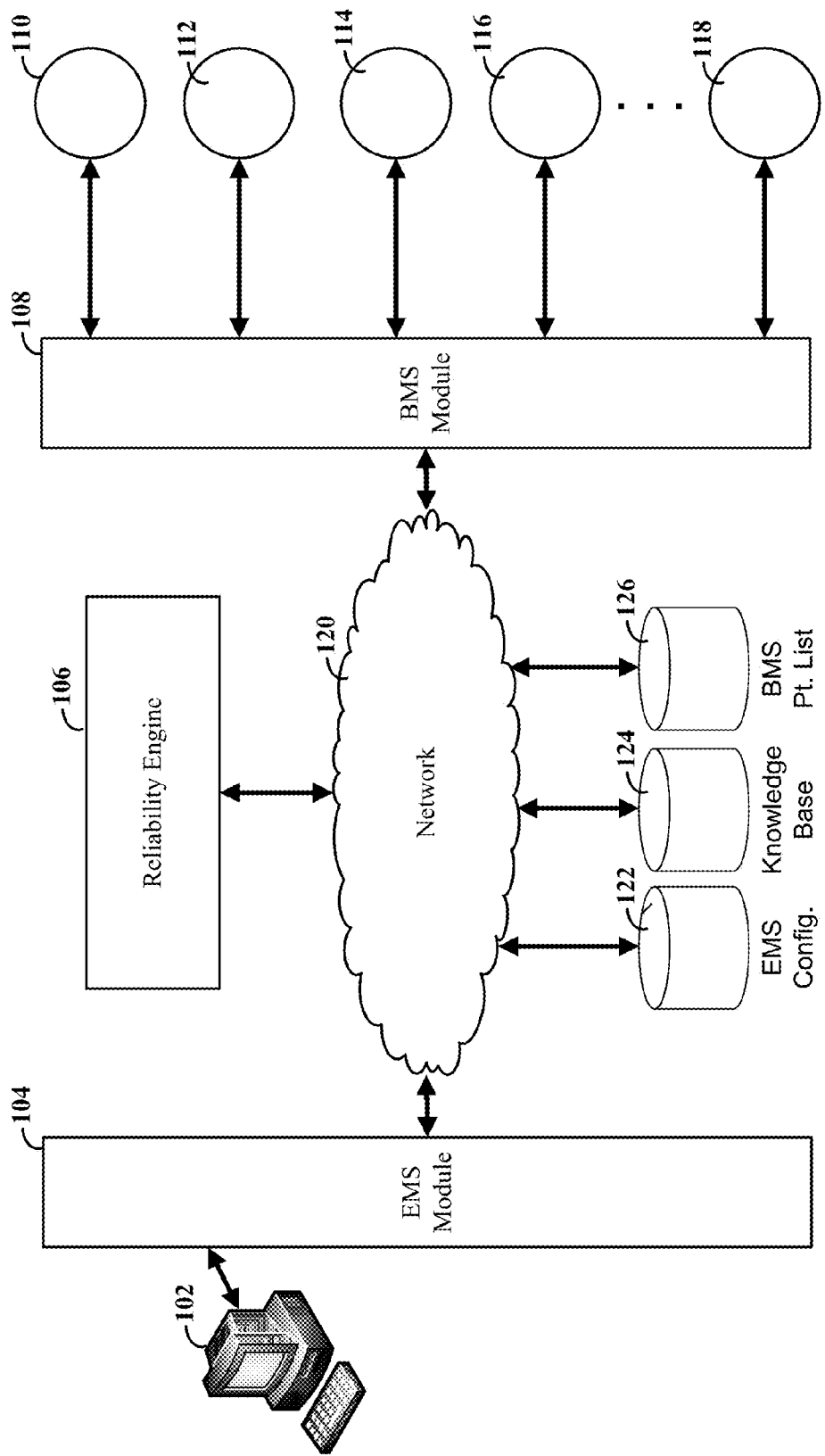
FIG. 1 depicts a system diagram for a building management system, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to energy management systems, more particular aspects relate to (automatically) processing updates to building systems using a quantified reliability analysis. While the present disclosure is not necessarily limited to such applications, various aspects of the disclosure may be appreciated through a discussion of various examples using this context.

Embodiments of the present disclosure are directed toward a system that is designed to accommodate changes to Building Management System (BMS) and energy related assets by managing events relating to the changes using a quantified reliability determination. For instance, a Building Energy Management System (BEMS) may use a BMS point list that relates to building energy assets (e.g., heating and cooling systems/components) that are available in the building. A point list can contain a list of control points related to a control operation of the various energy assets (e.g., sensing and controlling). With large systems, the point list can be large and complex. An Energy Management System (EMS) can provide fault detection and report diagnostic results for the various energy assets. As discussed herein, proper fault detection and reporting can be useful for timely detection of faults in the system. Aspects of the present disclosure provide intelligent and automated adjustment to EMS functions relevant to changes in the overall system, as may be indicated by changes to the point list.

Various embodiments use a knowledge history database that contains data collected from various inputs/devices over a period of time. This knowledge history database can, for example, store sensor data collected from different sensors at various time points. For instance, the point list can include a variety of different sensors. The knowledge history database can include a table with rows corresponding to the different points in the point list. The columns can store data that correspond to input from the sensors at different time periods. When the point list changes, one or more processing engines, tools, or modules can identify the changes and make appropriate modifications to the point list and to the EMS configuration. For instance, the engines can be configured to determine whether or not a new point, or set of points, corresponds to a prior point (e.g., as may happen when a component is replaced or upgraded). If so, then the point list can be modified such that the history for the replaced component is linked to the new, replacement component.

In embodiments of the present disclosure, an event that occurs relative to a modification to the point list (e.g., a replacement point or an entirely new point) can be assessed based upon information stored in the knowledge history base. This assessment can be used to increase the accuracy of event reporting, e.g., by reducing the number of false positives. For instance, a reliability engine can be configured to analyze sensor history data for a newly added point in order to quantify the reliability according to a statistical probability that a particular event is valid. In some embodiments, the data can be analyzed relative to a statistical model that determines the statistical relevance of the data (e.g., whether or not the differences between two data sets are statistically significant). In some embodiments, the statistical module may include factors such as sensor noise, sensor drift (e.g., temperature or time based), and the margin of error for the event trigger relative to normal operation.

Consistent with embodiments, the assessment of an event can be used to provide a reliability measure or value. This may be, for instance, a probability, expressed as a percentage, that the event is a false positive. Different thresholds can be set to determine how the system handles the reliability value. This may include, for example, whether the event is reported at all, how the event is communicated (e.g., with the reliability score or without the reliability score), and whether or not automated corrective measures are undertaken (e.g., shutting down a faulty device).

Turning now to the figures, the various modules, tools, and engines can be part of a computer system that includes at least one computer processor circuit that is configured to carry out the various functions describe herein. FIG. 1 depicts a system diagram for a building management system, consistent with embodiments of the present disclosure. BMS module 108 can be configured to interface with a number of different building assets, 110, 112, 114, 116, 118. The BMS module and the assets can communicate using a number of different interfaces including, but not necessarily limited to, point-to-point connections, shared data lines, data networks, wired, wireless and combinations thereof. Although not depicted, the system may also include a number of different control stations that provide local control and monitoring functions. As discussed herein, the assets can include various HVAC (heating, ventilation, and air conditioning) components and related sensors.

According to embodiments, the BMS can use a BMS point list stored in a database 126. The BMS point list can include identifiers for the various assets, configuration information, version history, and other information. The BMS can use the point list when managing the various assets. According to embodiments, a knowledge base containing data about the points in the point list can be stored in a database 124. The knowledge base may contain relationship information about the various assets (e.g., classification of points with similar assets into a subset of points that forms a shared class and other relationships). Moreover, the knowledge base can store historical data for (sensor or control) data that is collected over a period of time.

In embodiments, EMS module 104 can be configured to monitor and detect various events relating to the assets and the building components related thereto. The rules for determining when to trigger an event, alert or alarm can be stored in EMS configuration database 122. When an event is detected by the EMS module, the knowledge base database 124 can be consulted. The data stored in the knowledge base database can be used by a reliability engine 106 to determine the probability that a particular event is legitimate or valid (e.g., as opposed to being caused by sensor noise). In some embodiments, the reliability engine 106 to determine the probability that a particular point is still valid (e.g., whether it has been removed from the system). The determined probability can be compared against one or more threshold values by the EMS module in order to determine the appropriate response. For example, if the probability that an event is valid is sufficiently high, the event can be reported as legitimate to administrators of the system using an interface device 102 (a computer, laptop, mobile device, etc.). The administrators can then take appropriate action. If the probability of the event is sufficiently low, then the EMS module may not report the event at all. In some instances, the EMS module may report an event while also indicating, to an administrator, that the confidence in the event is relatively low (e.g., by providing an indication of the determined probability to an administrator).

Consistent with embodiments, the system (e.g., the EMS) can be configured to detect changes to the building assets by comparing different versions of the BMS point list to detect changes over time. If changes are detected, then the EMS can coordinate with the other components to determine what, if any, reconfiguration should be undertaken. For instance, the knowledge base database can be consulted to determine the appropriate settings for the EMS. The reliability module can then assess the various outputs of the EMS from a series of data points collected for the outputs over a period of time.

Figure 2:
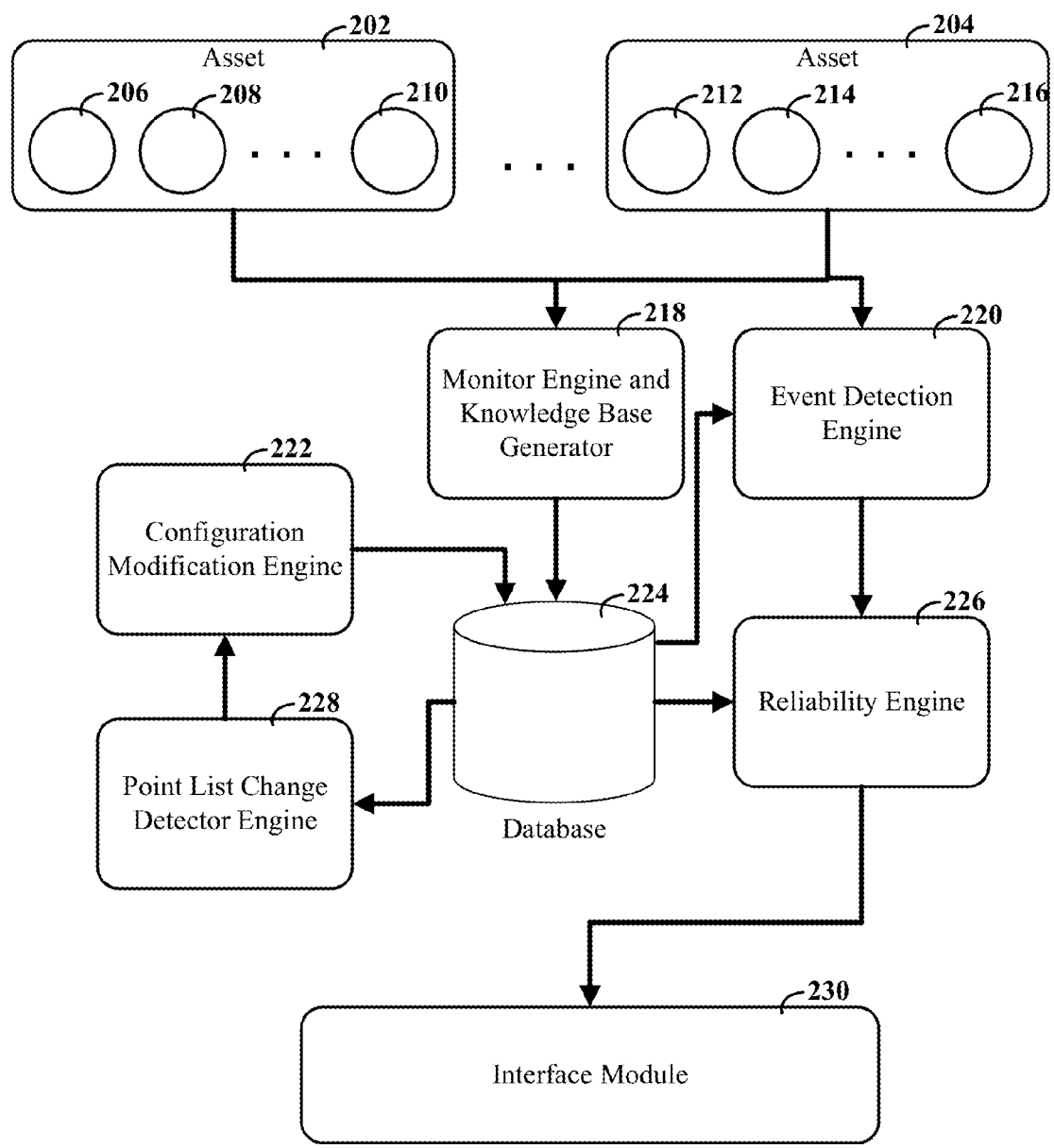
FIG. 2 depicts a flow diagram for an energy management system, consistent with embodiments of the present disclosure.

FIG. 2 depicts a flow diagram for an energy management system, consistent with embodiments of the present disclosure. A set of building assets 202, 204 can include one or more devices 206, 208, 210 and 212, 214, 216, respectively. The devices can include, but are not necessarily limited to, temperature sensors, interface modules, control modules, smoke detectors, and cooling actuator circuits. Each of the devices 206-216 can be represented by a different data point in the point list, which can be stored in one or more databases 224.

Monitor engine and knowledge base generator 218 can receive data from the devices and format the data for storage in database 224. For example, the database can store a table that has a row for each data point in the point list. The columns can contain data as it was received over a period of time. An example is shown in TABLE 1.

TABLE 1

| No | Data point name | Value at time step | | | | | | | | |
|---|---|---|---|---|---|---|---|---|---|---|
| | | 0 | 1 | 2 | 3 | 4 | 5 | 6 | 7 | 8 |
| 1 | AC1_RoomTemperature | 21.3 | — | — | 21.1 | 21.2 | 21.3 | 21.2 | — | — |
| 2 | AC1_CoolingSetpoint | 21 | 21 | 21 | 21 | 21 | 21 | 21 | 21 | 21 |
| 3 | AC1_CoolingActuator1 | 0 | — | — | — | — | — | — | — | — |
| 4 | AC2_RoomTemperature | 20.3 | 20.6 | 20.9 | 21.1 | 21.2 | 21.3 | 21.2 | 21 | 21 |
| 5 | AC2_CoolingSetpoint | 21 | 21 | 21 | 21 | 21 | 21 | 21 | 21 | 21 |
| 6 | AC2_CoolingActuator | 0 | 0 | 0 | 0.2 | 0.3 | 0.5 | 0.2 | 0 | 0 |

The time steps 0-8 can represent the value received for the different data points at specified times. For example, the time step could be hourly, daily, or at some other suitable periodic interval. It is also possible that the interval between time steps is not strictly periodic. For instance, the interval could change (e.g., for different times of day or data could be, at least partially, provided in response to triggering events). In some embodiments, the table could be modified to include timestamps for the time steps.

Consistent with embodiments, a point list change detector engine 228 can be configured to detect changes in the point list that signify changes in how the building system is configured and operating. For instance, the detector engine can be configured to detect the addition or removal of points from the point list by monitoring sensor data and other data (such as asset identifiers or version data). Moreover, the detector engine can be configured to determine what the changes signify. For example, the detector engine may detect that a set of points has stopped providing data. In certain embodiments, the detection may include detecting a null value that is consistent with the absence of a device or a failure of the device to respond to queries. The detector engine can be configured to correlate the set of points with one or more devices or systems (e.g., an air conditioning unit with multiple sensors). The detector engine may subsequently detect that a new set of points has been added to the point list. The detector engine can be configured to determine what type of device(s) or system(s) correspond to the new set of points. Moreover, the detector engine can be configured to identify relationships between modifications to the point list and existing or prior items in the point list. For instance, the detector engine could identify a new set of points as corresponding to an add-on/upgrade to an existing device or system, or as a replacement for a device or system that was recently removed from the point list.

With references to TABLE 1, a subsequent point list could correspond to the information in TABLE 2, copied below. The detector engine can be configured to identify differences between the point list at time step 8 (TABLE 1) and time step 9 (TABLE 2). For instance, three new points (7, 8 and 9) appear in the point list at time step 9, while points 3 and 6 have no data at time step 9. The detector engine can be configured to determine that points 3 and 6 are no longer present/valid. For each such point, the detector engine can further determine whether the point was removed, upgraded/replaced, or renamed (e.g., resulting from a sensor replacement). For our example, the detector engine may determine that point 3 (AC1_CoolingActuator1) was replaced by point 7 (AC1_CoolingActuator). As discussed in more detail herein, this determination can be based upon factors such as the asset id, asset type, and data point type. Using this and other data, the system may group a subset of the data points according to their similarities. This grouping can then be used to determine relationships between new points and old points. In this instance, the detector engine can then replace the existing point 3 with the new point 7, which can allow for the history data from point 3 to be used in connection with the new point 7.

TABLE 2

| No | Data points | Value at time step 9 |
|---|---|---|
| 1 | AC1_RoomTemperature | 21.3 |
| 2 | AC1_CoolingSetpoint | 21.0 |
| 3 | AC1_CoolingActuator1 | — |
| 4 | AC2_RoomTemperature | 20.4 |
| 5 | AC2_CoolingSetpoint | 21.0 |
| 6 | AC2_CoolingActuator | 0.0 |
| 7 | AC1_CoolingActuator | 0.4 |
| 8 | AC1_HeatingSetpoint | 19.0 |
| 9 | AC1_HeatingActuator | 0 |

Pseudo code for detecting and accommodating changes to the point list is provided below:

FOR EACH data point (DP) d which is part of the point list (PL) at time t-1 but not part of PL at time t DO
    IF there is a data point d' in the PL at time t that has the same
    asset id, asset type, and data point type as d THEN
        Add (d,d') to the set of replaced DPs ELSE Add d to the set
of removed DPs FOR EACH data point d which is part of the point list

```
(PL) at time t but not part of PL at time t-1 or part of a tuple in set of
replaced DPs DO
    Add d to the set of new DPs
```

According to embodiments, a configuration modification engine 222 can be configured to modify the configuration settings for the building management system, and more particularly, to modify the EMS configuration settings. For instance, when the detector engine 228 determines that a point has been removed, the corresponding EMS functionality can be disabled or removed. This may include, turning off alarms associated with a sensor that is no longer present. It may also include changes to interdependencies between various components. For example, if a sensor is no longer present in a particular area (e.g., room), the configuration settings can be changed so that heating and cooling functions and alarms for that area can be based upon other, nearby, sensors.

In other instances, the detector engine 228 may determine that a point has been replaced with an equivalent, or similar, point. The configuration modification engine can then apply the existing configuration settings and their functionality to the new, replacement, point. In some embodiments, the configuration modification engine can account for differences between the new and old point and make modifications to the configuration settings accordingly. For example, if a new sensor has more precision than the prior sensor, the tolerances for associated functionality and alarms can be tightened. The result may be improved efficiencies. Another example could be that a replacement part has additional functionalities for which the configuration modification engine can create new configuration settings (e.g., by adding new alarms corresponding to new data).

In various embodiments, the configuration modification engine can add new functionality in the configuration settings for a point that does not correlate to a recently removed point. This may include copying an existing functionality from a similar point, creating an entirely new set of functionality, or combinations thereof.

Pseudo code for configuring functionality for a new point is provided below:

```
FOR EACH data point d in set of removed DPs DO remove all EMS
functionality with d as input
FOR EACH tuple (d,d') in set of replaced DPs DO replace all occurrences
of d in every EMS functionality by d'
FOR EACH energy asset associated with a data point in the set of new
DPs DO configure new EMS functionality
```

Referring to the example provided in TABLES #1 and #2, the detector engine may identify points 8 (AC1_HeatingSetpoint) and 9 (AC1_HeatingActuator) as being in the set of new points, rather than replacement points. Accordingly, the configuration modification engine can update the configuration settings for the EMS with new functionality for the corresponding points (e.g., alarms and energy/temperature handling rules).

According to embodiments, the changes to the configuration of the EMS can be assessed for their reliability using a reliability engine 226. For instance, in the case that the configuration changes relate to an alarm, the reliability engine can be configured to assess the likelihood that any particular alarm is valid. Moreover, the reliability engine can also be configured to determine a reliability for any event based upon an associated point and set of data. As a particular example and with reference to the above tables, an alarm rule could specify that an alarm is generated if the temperature of the AC.RoomTemperature point is higher than the set point indicated by the AC.CoolingSetPoint for any air conditioning unit in the building for a set amount of time (e.g., the prior 10 time steps), or for a percentage of the time (e.g., the condition is met for at least 80% of the prior 10 steps). The occurrence of this, or other events, can be detected using an event detection engine 220. The determined reliability can be used to determine how (or whether) to respond to a detected event. This may include, for example, what information to communicate to an administrator using an interface module 230.

Returning to the set point alarm example, the rule raises an alarm if the specified condition is satisfied for any air conditioner. The reliability determination can be used to prevent false positives from being reported. This may include, for example, excluding alarms below a reliability threshold (e.g., 95%). A corresponding alarm, however, can still be reported so long as at least one air conditioner associated with the same alarm is determined to be sufficiently reliable. According to embodiments, the computation of the unreliability for one air conditioner satisfying the condition can be done by determining how statistically significant it is that the alarm was not issued because of sensor noise. For example, the reliability engine can use the p-value of a one-sided (a single confidence bound) Welch's T-Test (wttest) to determine the probability that the mean of the room temperature is not larger than the mean of the cooling set point. The reliability engine can also determine and provide the mean noise of the data point.

Pseudo code for determining the reliability of an alarm or other event, with a 95% threshold, is provided below:

```
FOR EACH rule r in EMS of type R1 that triggered alarm at time k DO
    INIT failRel = 1,    noiseAll = ø
    FOR EACH data point tuple (d,s) used by r with d of type
    AC.RoomTemperature and s of type AC.CoolingSetPoint such that
    dv_i > sv_i ∀ i ∈ {k – 9, ... , k} // xv_i is the value of data point
    x at time i.
        (fail_d_s, noise) = wttestP (dv_{k-9}, ... , dv_k, sv_{k-9}, ... , sv_k)
        noiseALL = noiseALL ∪ (d,s,noise).
        failRel = failRel * fail_d_s
    rel = 1−failRel
    IF rel<0.95 RETURN (rel, noiseALL )
```

Figure 3:
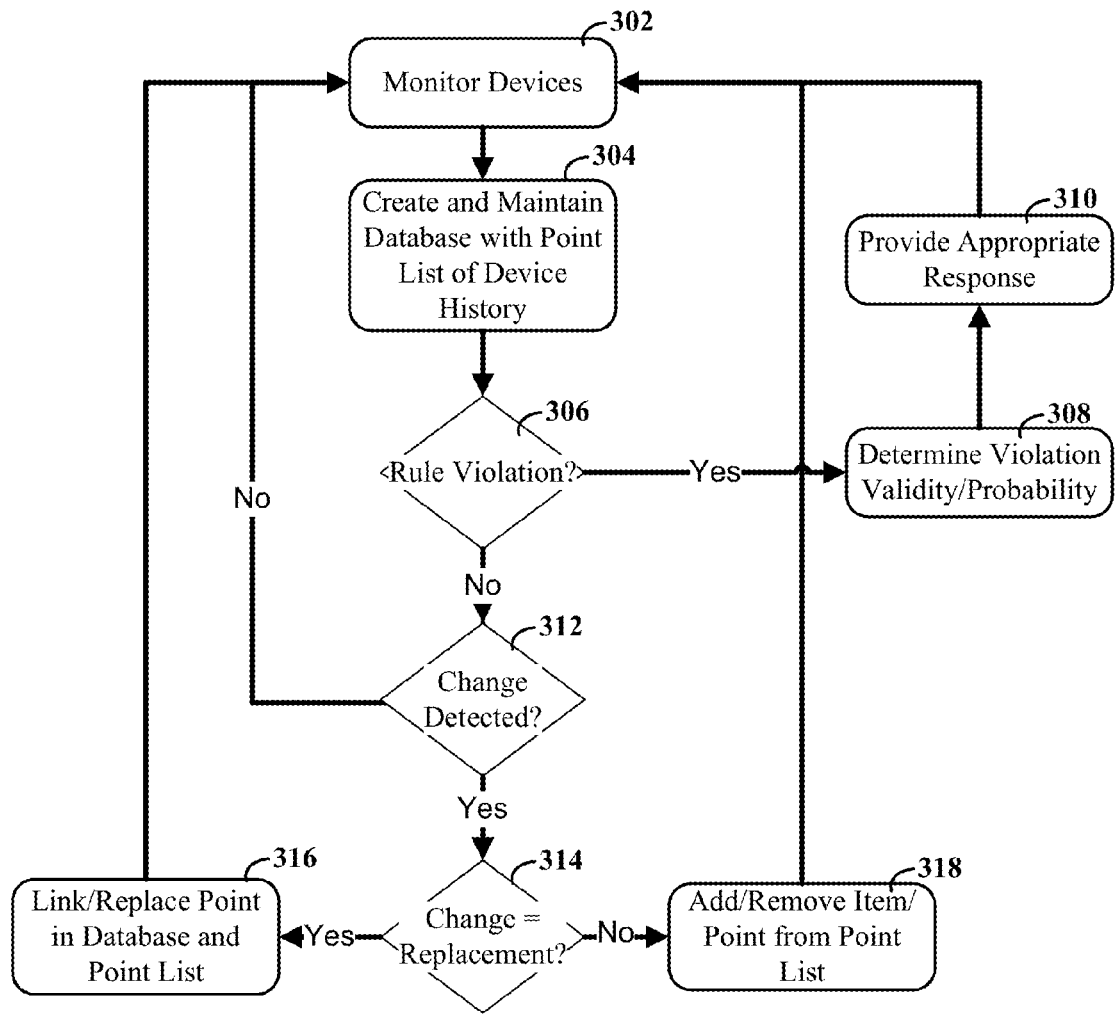
FIG. 3 depicts a flow diagram for use with energy management systems, consistent with embodiments of the present disclosure.

FIG. 3 depicts a flow diagram for use with energy management systems, consistent with embodiments of the present disclosure. The flow begins with the active monitoring of the various devices and components of the system, per block 302. For instance, the EMS can monitor the data received from various devices and sensors. The EMS module can use this data to create and maintain a database that includes device history for various points in the point list, per block 304. For instance, the database can store data for a set amount of time (e.g., for the past year, month, or day) for the various devices and sensors. In certain embodiments, the database can be configured to store data in different manners to account for longer time periods or additional information. For instance, the database can store historical data from longer than a year ago in the form of statistical information, such as a mean value and standard deviation for the older data that would otherwise age out of the database.

The EMS module can also determine whether or not an event trigger, such as a rule violation, has occurred, as shown by decision block 306. For instance, the EMS module can review the monitored data stored in the database based upon a set of configuration settings. The configuration settings can include a number of different rules that specify when, or if, a particular action should be taken. For instance, a rule may specify that an air conditioning unit should not run more than a percentage of the time, where the percent is a function of the external temperature (which may affect the expectations for how much the air conditioning unit should run). Moreover, the event trigger could be the application of a rule to a new data point so that the probability of the rule being valid can be determined. For ease of discussion, the flow of FIG. 3 is discussed in the context of a rule violation; however, the probability of the rule itself being valid can also be determined.

If a rule violation is detected, the EMS module can then determine the statistical probability that the violation is valid, per block 308. As discussed herein, this determination can use the history data stored in the database to assess the likelihood that an error producing factor (such as sensor noise) is the root cause of the rule violation (e.g., the violation a false positive). The EMS system can use the determined probability to provide the appropriate response (if any), as shown in block 310. This may include providing an alarm or update to an administrator when the probability of a false positive is below a threshold value. Another response could be to provide an alarm or update along with the determined probability, so that the administrator can make an informed decision on whether or not the rule violation is legitimate.

Apart from a rule violation, an EMS can be configured to detect a change in the point list, per block 312. This may include the addition or removal of items in the point list. For instance, the EMS can detect that no data is coming from a particular item for a period of time and infer that the item is no longer present or active. The EMS might also detect that data is coming in from a new item, which is new to, or not yet in, the list. Per decision block 314, the EMS can determine whether or not the change represents a replacement point/item—a new item that is taking the place of a past item that is no longer present or active. If so, then the EMS can link the replacement point to the past point so that the existing configuration, history, and associated functionality for the past point can be applied to the replacement point, as shown in block 316. If not, then the EMS can add or remove the point from the point list, as shown in block 318.

In embodiments of the present disclosure, the system can be configured to continuously monitor the devices, as shown by the various arrows returning to block 302.

Figure 4:
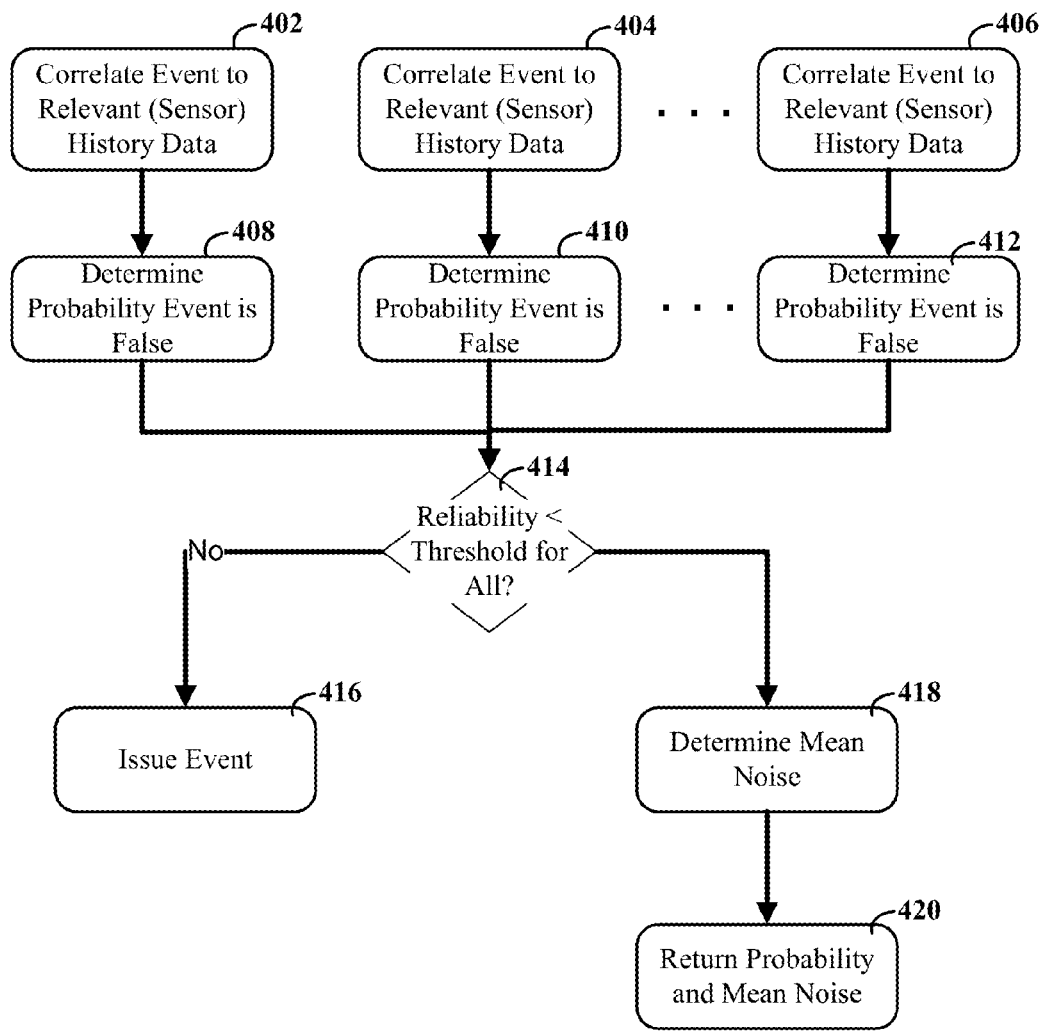
FIG. 4 depicts a flow diagram for handling a detected event, consistent with embodiments of the present disclosure.

FIG. 4 depicts a flow diagram for handling a detected event, consistent with embodiments of the present disclosure. Various embodiments are directed toward an EMS that can be designed to handle multiple different triggering events or alarms at the same time and in parallel. For each event, the EMS can correlate the event to relevant history data stored in the database, per blocks 402, 404, 406. For example, each event can be associated with a triggering event that is based upon sensor data. The sensor data history for the corresponding sensors can be correlated to, and retrieved for, each event.

A reliability engine can then determine the probability that the each event is false, per blocks 408, 410, 412. As discussed herein, this determination can use a statistical analysis, such as a p-value of a one-sided (a single confidence bound) Welch's T-Test. The Welch's T-Test assumes that two groups of data are sampled from Gaussian populations, but does not assume those the two populations have the same standard deviation.

Consistent with various embodiments of the present disclosure, the related events associated with 402, 404 and 406 can result in the issuance of an event to an administrator, if any one of the events is determined to be statistically valid, per decision block 414. Thus, if the statistical reliability of each event is not below a threshold value, then at least one event is valid and the system can issue the event (e.g., by providing an alarm to an administrator or taking automated actions such as disabling a faulty device), per block 416. If, however, if the statistical reliability of each event is below a threshold value, then there is no valid event. In certain embodiments, the EMS can be configured to determine the mean noise of the system, per block 418 and then provide both the mean noise and determined probability/reliability, per block 420. This information can then be used by an administrator to assess what actions, if any, could be taken.

Figure 5:
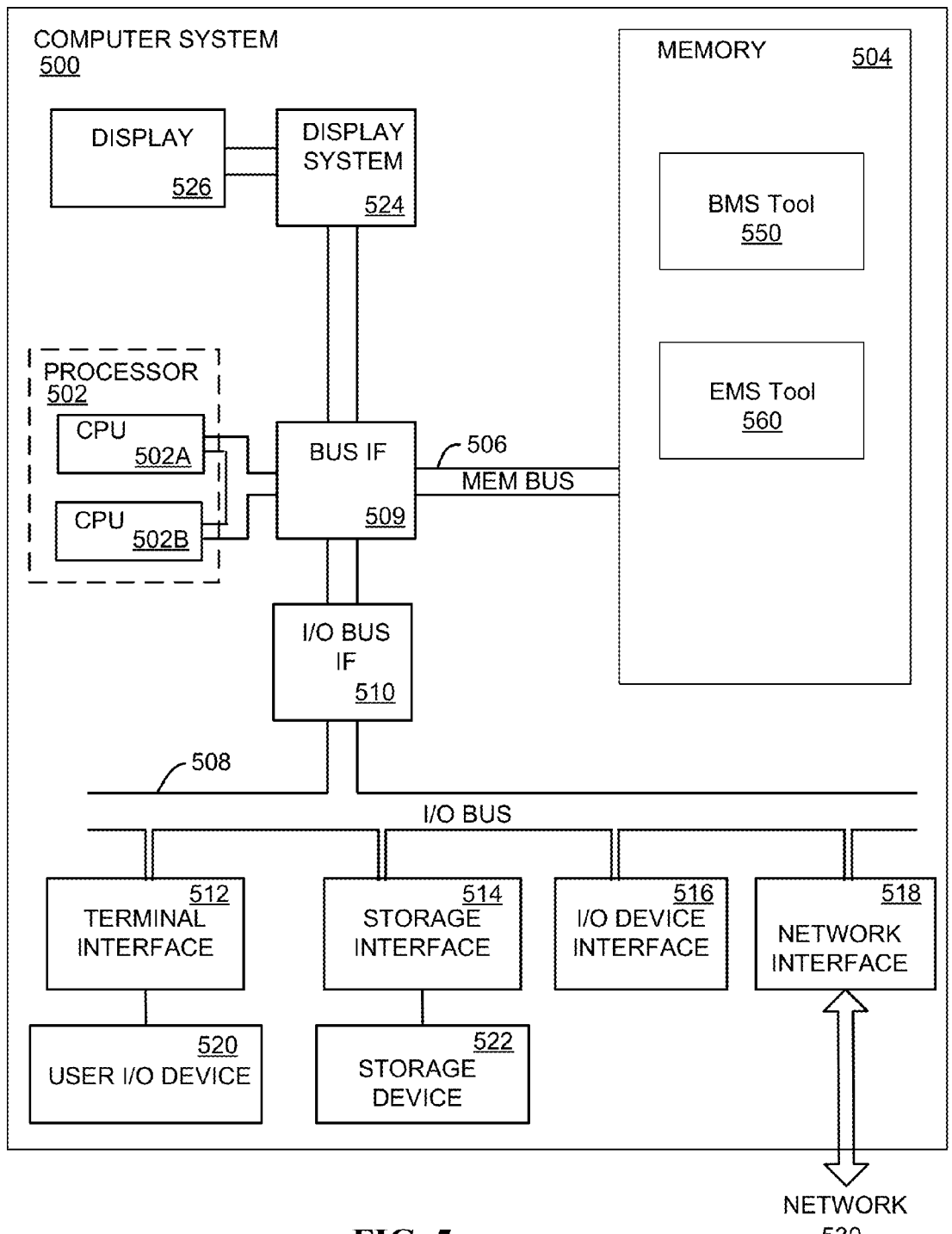
FIG. 5 depicts a high-level block diagram of a computer system, consistent with various embodiments of the present disclosure.

FIG. 5 depicts a high-level block diagram of a computer system 500 consistent with various embodiments of the present disclosure. The mechanisms and apparatus of the various embodiments disclosed herein apply equally to an appropriate computing system. The major components of the computer system 500 include one or more processors 502, a memory 504, a terminal interface 512, a storage interface 514, an I/O (Input/Output) device interface 516, and a network interface 518, all of which are communicatively coupled, directly or indirectly, for inter-component communication via a memory bus 506, an I/O bus 508, bus interface unit 509, and an I/O bus interface unit 510.

The computer system 500 may contain one or more general-purpose programmable central processing units (CPUs) 502A and 502B, herein generically referred to as the processor 502. In embodiments, the computer system 500 may contain multiple processors; however, in certain embodiments, the computer system 500 may alternatively be a single CPU system. Each processor 502 executes instructions stored in the memory 504 and may include one or more levels of on-board cache.

In embodiments, the memory 504 may include a random-access semiconductor memory, storage device, or storage medium (either volatile or non-volatile) for storing or encoding data and programs. In certain embodiments, the memory 504 represents the entire virtual memory of the computer system 500, and may also include the virtual memory of other computer systems coupled to the computer system 500 or connected via a network. The memory 504 can be conceptually viewed as a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 504 may store all or a portion of the various programs, modules and data structures for processing data transfers as discussed herein. For instance, the memory 504 can store BMS tool, engine, or module 550 and/or EMS tool, engine, or module 560. Consistent with certain embodiments, these tools can be implemented as part of one or more monitor threads. These programs and data structures are illustrated as being included within the memory 504 in the computer system 500, however, in other embodiments, some or all of them may be on different computer systems and may be accessed remotely, e.g., via a network. The computer system 500 may use virtual addressing mechanisms that allow the programs of the computer system 500 to behave as if they only have access to a large, single storage entity instead of access to multiple, smaller storage entities. Thus, while the BMS tool 550 and the EMS tool 560 are illustrated as being included within the memory 504, these components are not necessarily all completely contained in the same storage device at the same time. Further, although the BMS tool 550 and the EMS tool 560 are illustrated as being separate entities, in other embodiments some of them, portions of some of them, or all of them may be packaged together (e.g., as part of the same monitor thread).

In embodiments, the BMS tool 550 and the EMS tool 560 may include instructions or statements that execute on the processor 502 or instructions or statements that are interpreted by instructions or statements that execute on the processor 502 to carry out the functions as further described below. In certain embodiments, the BMS tool 550 and the EMS tool 560 can be implemented in hardware via semiconductor devices, chips, logical gates, circuits, circuit cards, and/or other physical hardware devices in lieu of, or in addition to, a processor-based system. In embodiments, the BMS tool 550 and the EMS tool 560 may include data in addition to instructions or statements.

The computer system 500 may include a bus interface unit 509 to handle communications among the processor 502, the memory 504, a display system 524, and the I/O bus interface unit 510. The I/O bus interface unit 510 may be coupled with the I/O bus 508 for transferring data to and from the various I/O units. The I/O bus interface unit 510 communicates with multiple I/O interface units 512, 514, 516, and 518, which are also known as I/O processors (IOPs) or I/O adapters (IOAs), through the I/O bus 508. The display system 524 may include a display controller, a display memory, or both. The display controller may provide video, audio, or both types of data to a display device 526. The display memory may be a dedicated memory for buffering video data. The display system 524 may be coupled with a display device 526, such as a standalone display screen, computer monitor, television, or a tablet or handheld device display. In one embodiment, the display device 526 may include one or more speakers for rendering audio. Alternatively, one or more speakers for rendering audio may be coupled with an I/O interface unit. In alternate embodiments, one or more of the functions provided by the display system 524 may be on board an integrated circuit that also includes the processor 502. In addition, one or more of the functions provided by the bus interface unit 509 may be on board an integrated circuit that also includes the processor 502.

The I/O interface units support communication with a variety of storage and I/O devices. For example, the terminal interface unit 512 supports the attachment of one or more user I/O devices 520, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 500, and may receive output data via the user output devices. For example, a user interface may be presented via the user I/O device 520, such as displayed on a display device, played via a speaker, or printed via a printer.

The storage interface 514 supports the attachment of one or more disk drives or direct access storage devices 522 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 522 may be implemented via any type of secondary storage device. The contents of the memory 504, or any portion thereof, may be stored to and retrieved from the storage device 522 as needed. The I/O device interface 516 provides an interface to any of various other I/O devices or devices of other types, such as printers or fax machines. The network interface 518 provides one or more communication paths from the computer system 500 to other digital devices and computer systems; these communication paths may include, e.g., one or more networks 530.

Although the computer system 500 shown in FIG. 5 illustrates a particular bus structure providing a direct communication path among the processors 502, the memory 504, the bus interface 509, the display system 524, and the I/O bus interface unit 510, in alternative embodiments the computer system 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the computer system 500 may, in fact, contain multiple I/O bus interface units 510 and/or multiple I/O buses 508. While multiple I/O interface units are shown, which separate the I/O bus 508 from various communications paths running to the various I/O devices, in other embodiments, some or all of the I/O devices are connected directly to one or more system I/O buses.

In various embodiments, the computer system 500 is a multi-user mainframe computer system, a single-user system, or a server computer or similar device that has little or no direct user interface, but receives requests from other computer systems (clients). In other embodiments, the computer system 500 may be implemented as a desktop computer, portable computer, laptop or notebook computer, tablet computer, pocket computer, telephone, smart phone, or any other suitable type of electronic device.

FIG. 5 depicts a representative of certain major components of the computer system 500. Individual components, however, may have greater complexity than represented in FIG. 5, components other than or in addition to those shown in FIG. 5 may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for monitoring energy usage within at least one building having a plurality of energy consuming components, the method comprising:
   generating a database containing values for a set of data points corresponding to data received from respective sensors of a plurality of sensors associated with the plurality of energy consuming components;
   detecting a change in a configuration for the plurality of sensors based upon a change in values received from the plurality of sensors relative to the database;
   adding, based upon the change, an additional data point to the set of data points in the database by:
      determining that the additional data point is a replacement for an existing data point;
      determining that the additional data point is associated with a replacement sensor having improved precision relative to an original sensor associated with the existing data point; and
      creating updated configuration data based on the improved precision, wherein the updated configuration data comprises an updated alarm based on an updated rule associated with the improved precision;
   determining, by a reliability engine and based upon the values for the set of data points, a probability that the updated rule for the additional data point is valid;
   generating, in response to the determined probability, a message that includes the determined probability; and
   automatically shutting down, by the reliability engine, the original sensor in response to determining that the original sensor is malfunctioning.

2. The method of claim 1, wherein the probability that the updated rule is valid represents the probability that a violation of the updated rule is valid.

3. The method of claim 1, wherein the determining the probability further comprises identifying a subset of data points, from the set of data points, that have similarities to the additional data point and using values from the subset of data points to determine the probability that the updated rule for the additional data point is valid.

4. The method of claim 1, wherein detecting the change in the configuration for the plurality of sensors further comprises:
   comparing the values received from the plurality of sensors to a point list stored in the database; and
   identifying points in the point list that have null data stored in the database.

5. The method of claim 4, wherein determining the probability further comprises comparing two populations of data from the database, wherein each population corresponds to a respective point in the point list and contains a set of data collected over a period of time.

6. The method of claim 2, wherein determining a probability further comprises applying a Welch's T-Test that uses a confidence bound that corresponds to a probability threshold.

7. The method of claim 6, further comprising determining that the violation of the updated rule is valid based upon a p-value from the Welch's T-Test.

8. The method of claim 1, wherein the replacement sensor is further associated with a new functionality, wherein the method further comprises:
   creating updated configuration data based on the new functionality, wherein the updated configuration data comprises a new alarm based on a new rule associated with the new functionality.

9. The method of claim 1, wherein the plurality of sensors comprise at least one temperature sensor, at least one interface module, at least one control module, at least one smoke detector, and at least one cooling actuator circuit.

10. A computer system for monitoring energy usage within at least one building having a plurality of energy consuming components, the system comprising:
   at least one processor circuit configured to include:
      a knowledge base generator configured to generate a database containing values for a set of data points corresponding to data received from respective sensors of a plurality of sensors associated with the plurality of energy consuming components;
      a change detector engine configured to:
         detect a change in a configuration for the plurality of sensors based upon a change in values received from the plurality of sensors relative to the database; and
         add, based upon the change, an additional data point to the set of data points in the database;
      a configuration modification engine configured to modify configuration settings to include an updated rule for the additional data point by:
         determining that the additional data point is a replacement for an existing data point;
         determining that the additional data point is associated with a replacement sensor having improved precision relative to an original sensor associated with the existing data point; and
         creating updated configuration data based on the improved precision, wherein the updated configuration data comprises an updated alarm based on the updated rule associated with the improved precision;
      a reliability engine configured to determine, based upon the values for the set of data points, a probability that the updated rule for the additional data point is valid;
      an interface module configured to generate, in response to the determined probability, a message that includes the determined probability; and
      the reliability engine further configured to automatically shut down the original sensor in response to determining that the original sensor is malfunctioning.

11. The system of claim 10, wherein the probability that the rule is valid represents the probability that a violation of the rule is valid.

12. The system of claim 10, wherein the reliability engine is further configured to determine the probability by identifying a subset of data points, from the set of the data points, that have similarities to the additional data point and using values from the subset of data points to determine the probability that the updated rule for the additional data point is valid.

13. The system of claim 10, wherein the change detector engine is further configured to detect the change in a configuration for the plurality of sensors by:
   comparing the values received from the plurality of sensors to a point list stored in the database; and
   identifying points in the point list that have null data stored in the database.

14. The system of claim 13, wherein the reliability engine is further configured to determine the probability by comparing two populations of data from the database, wherein each population corresponds to a respective point in the point list and contains a set of data collected over a period of time.

15. The system of claim 10, wherein the reliability engine is further configured to determine the probability by applying a Welch's T-Test that uses a confidence bound that corresponds to a probability threshold.

16. The system of claim 15, wherein the reliability engine is further configured to determine that the updated rule is valid based upon a p-value from the Welch's T-Test.

17. A computer program product for monitoring energy usage within at least one building having a plurality of energy consuming components, the computer program product comprising a computer readable storage medium having program instructions embodied therewith, wherein the computer readable storage medium is not a transitory signal per se, the program instructions executable by at least one computer processor circuit to cause the at least one computer processor circuit to perform a method comprising:

generating, by the at least one computer processor circuit, a database containing values for a set of data points corresponding to data received from respective sensors of a plurality of sensors associated with the plurality of energy consuming components;

detecting, by the at least one computer processor circuit, a change in a configuration for the plurality of sensors based upon a change in values received from the plurality of sensors relative to the database;

adding, by the at least one computer processor circuit and based upon the change, an additional data point to the set of data points in the database by:

determining that the additional data point is a replacement for an existing data point;

determining that the additional data point is associated with a replacement sensor having improved precision relative to an original sensor associated with the existing data point; and creating updated configuration data based on the improved precision, wherein the updated configuration data comprises an updated alarm based on an updated rule associated with the improved precision;

determining, by the at least one computer processor circuit and based upon the values for the set of data points, a probability that the updated rule for the additional data point is valid; and generating, by the at least one computer processor circuit and in response to the probability, a message that includes the determined probability; and automatically shutting down, by the at least one computer processor circuit, the original sensor in response to determining that the original sensor is malfunctioning.

18. The computer program product of claim 17, wherein the probability represents a validity of a violation of the updated rule.

19. The computer program product of claim 17, wherein determining the probability further comprises comparing two populations of data from the database, wherein each population corresponds to a respective point in a point list and contains a set of data collected over a period of time.

* * * * *